United States Patent [19]

Rex

[11] 4,137,719

[45] Feb. 6, 1979

[54] METHOD FOR ENERGY EXTRACTION FROM HOT DRY ROCK SYSTEMS

[76] Inventor: Robert W. Rex, 2780 Casalero Dr., La Habra, Calif. 90631

[21] Appl. No.: 778,388

[22] Filed: Mar. 17, 1977

[51] Int. Cl.² .............................................. F03G 7/04
[52] U.S. Cl. ..................................... 60/641; 60/651; 252/8.55 B; 166/310
[58] Field of Search .......................... 60/641, 651, 671; 165/45; 252/67, 8.55 B; 166/244 C, 279, 310

[56] References Cited

U.S. PATENT DOCUMENTS

| | | | |
|---|---|---|---|
| 3,437,451 | 4/1969 | Every et al. | 299/5 X |
| 3,951,794 | 4/1976 | Swearingen | 60/641 X |

Primary Examiner—Allen M. Ostrager
Assistant Examiner—Stephen F. Husar
Attorney, Agent, or Firm—Kenyon & Kenyon, Reilly, Carr & Chapin

[57] ABSTRACT

In order to prevent scale formation in a hot dry rock geothermal system, a mixture of acetone and water is utilized as the working fluid. Such fluid reduces the amount of scale formation generally associated with such system.

11 Claims, 1 Drawing Figure

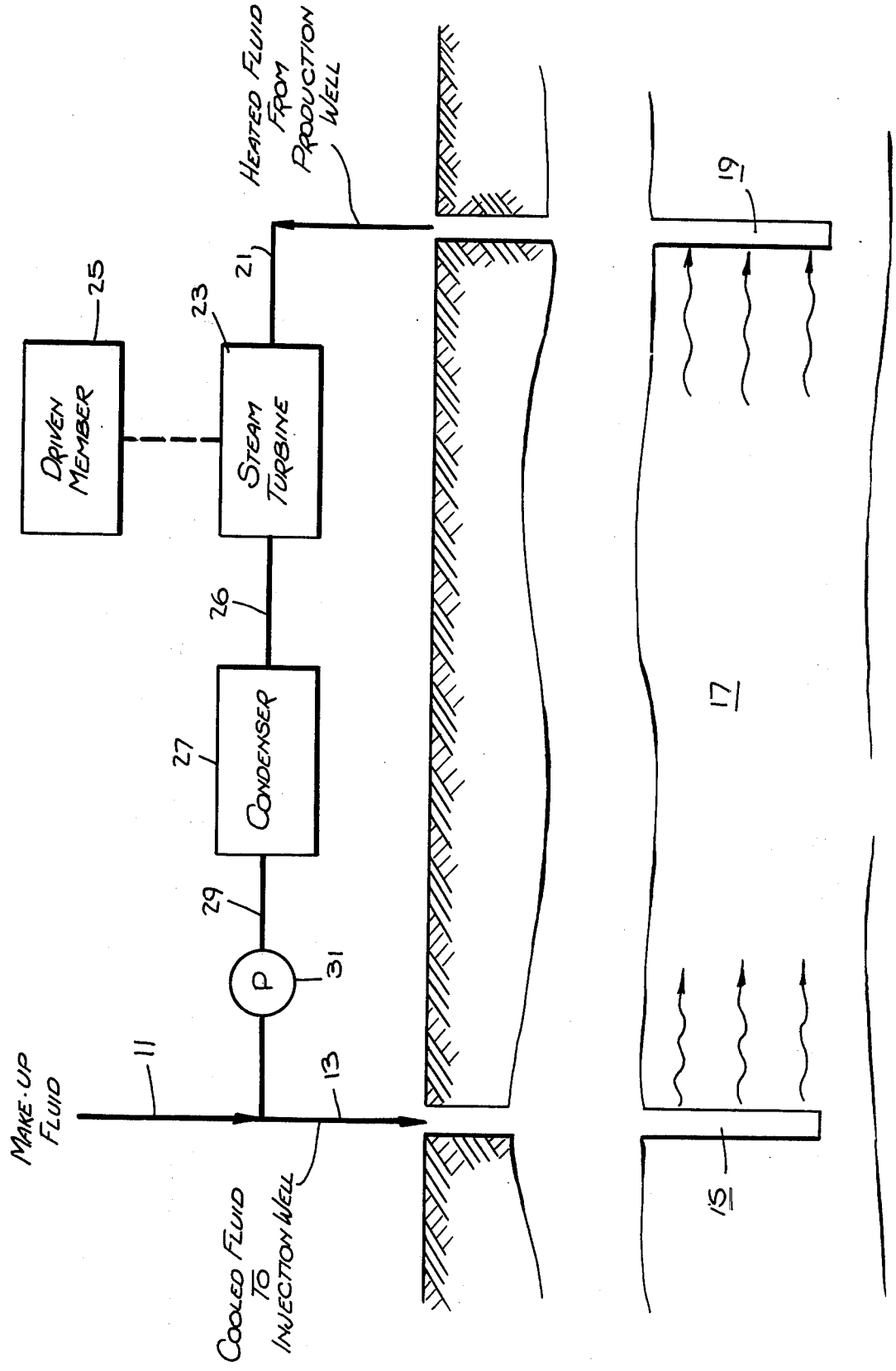

METHOD FOR ENERGY EXTRACTION FROM HOT DRY ROCK SYSTEMS

BACKGROUND OF THE INVENTION

This invention relates to geothermal energy in general and more particularly to an improved method of extracting geothermal energy in a hot, dry rock system.

With the shortage of petroleum products and high prices, there is a great deal of interest in alternate sources of energy. One such source is geothermal energy. This energy is energy taken from the natural heat of the earth. Various systems have been developed for such purposes. Typical are those disclosed in U.S. Pat. Nos. 3,187,038, 3,786,858 and 3,911,638. In a hot dry rock system such as that disclosed in U.S. Pat. No. 3,817,038, an injection well and a production well are drilled and a working fluid is injected into a geothermal area through the injection well, the fluid forces through the formation with simultaneous heating and the heated working fluid then recovered from the production well. The recovered heated fluid is then used on the surface to generate energy. For example, the heated working fluid may be expanded and the vapor separated and delivered to a steam turbine. The remaining liquid along with any makeup water then being reinjected in the injection well to form a closed system.

One of the major problems associated with hot dry rock systems is the adverse effects of using water as the heat extraction or working fluid.

Recent experiments have demonstrated that substantial silica and mineral dissolution takes place when either distilled water or sodium chloride brines come into contact with typical rock materials. The rate of interaction between rock material and the circulating fluid is significantly increased when the fluids contain sodium chloride. Dense coatings of alteration products form and marked swelling takes place within the rock material.

The presence of dissolved materials in the circulating working fluid will cause harmful scale formation when the hot water is flashed to steam. Of course, this can be mitigated to some degree through the use of an intermediate heat exchanger that heats a secondary working fluid such as isobutane or propane. However, the intermediate heat exchanger will still be susceptible to scaling problems and a two stage system will typically cost significantly more than a direct steam turbine system.

In view of this, the need for an improved working fluid which reduces these problems become evident.

SUMMARY OF THE INVENTION

The present invention provides such a working fluid. In accordance with the present invention, a mixture of a ketone, preferably acetone, and water is used as the working fluid. Such a mixture carries very much less silica, salts, etc. in solution than does pure water. In addition, acetone-water mixtures have a strong tendency to floculate colloidal materials such as clays, and suppress their dispersion. Furthermore, acetone water mixtures have a lower boiling point than water alone.

BRIEF DESCRIPTION OF THE DRAWING

The single FIGURE illustrates the type of system in which the fluid of the present invention may be used.

DETAILED DESCRIPTION OF THE INVENTION

In accordance with the present invention, a mixture made of 2 to 100% acetone and the remainder water is used as the working fluid. For avoiding salt in solution the range of 2 to 20% is sufficient. Maximum thermodynamic efficiency results with a percentage of 10 to 30%. However, the actual amount desirable will depend on temperatures encountered by the system (acetone lowers the freezing point and greater amounts of acetone up to near 100% may be advisable in some cases) and cost factors. For example, the use of more acetone may be desirable in cold weather to prevent freezing of the acetone water mixture in the cooling system in the event that air cooling is employed and air temperatures are considerably below freezing. Also, if there is water in the geothermal system which will dilute the working fluid, greater amounts of acetone will be needed to maintain the desired percentages through out the system. Studies have shown that such a mixture will carry less silica, less salts and other materials in solution than will pure water. Also, because of its lower boiling point it can be used to extract useful heat energy in the fractured rock of a hot dry rock system which is at a lower rock temperature than would be possible with water. Furthermore, because of the fact that less of such materials are dissolved in the solution, the system will be free of scaling or, in any case, scaling will be greatly reduced as the working fluid is flashed into a vapor. Furthermore, formation of clays are suppressed. Clays naturally present will not ordinarily disperse and a direct use of turbines with the expanded vapor is possible. Preferably, a system such as that shown in the aforementioned U.S. Pat. No. 3,817,038 utilizing a surface condenser in which the condensate from the turbine is reinjected will be utilized to minimize the amount of acetone consumed in carrying out the process of the present invention, i.e., rather than a turbine system exhausting to the atmosphere.

Such a system is shown in basic block diagram form on the FIGURE. Shown is a closed loop system containing the working fluid of the present invention. Fluid is initially supplied to the system and made up over a line 11. The line 11 connects with a line 13 which is the input to an injection well 15. The injection well is drilled down to the depth of the hot rock system designated as 17. The fluid flows through the hot rock system and is collected in a production well 19. The output from the production well 19, which will be the fluid heated by the hot dry rock system 17, flows in a line 21 to a steam turbine 23 where it is expanded. The turbine is used to drive a driven member 25 such as a generator. The working fluid from the steam turbine, in the form of a vapor is exhausted over a line 25 to a condenser 27 where it is brought back into the liquid state. This liquid then flows through a line 29 to a pump 31 which pumps it back into the injection well 15. As noted above, the use of a closed loop with a condenser conserves the working fluid. Whatever losses are encountered can be made up by supplying make up fluid over the line 11.

What is claimed is:

1. A method of operating a hot dry rock geothermal system in which a fluid is injected into an injection well, passes through a geothermal reservoir formation and is recovered in a production well and flashed into a vapor, from which energy is extracted, the improvement comprising utilizing as the fluid a mixture of a ketone and water thereby substantially eliminating problems with scale formation in the system when the heated fluid is flashed to steam and also permitting, because of the lower boiling point of the mixture, operating with geothermal formations having lower rock temperatures.

2. The method according to claim 1 wherein said ketone is acetone.

3. The method according to claim 2 wherein said fluid contains 2-99% acetone and the remainder water.

4. The method according to claim 3 wherein said fluid contains 10 to 30% acetone.

5. The method according to claim 1 wherein said energy is extracted by using said vapor to drive a turbine.

6. The method according to claim 5 and further including condensing the exhaust from said turbine and reinjecting it in the well.

7. The method according to claim 5 wherein said fluid contains 2-99% acetone and the remainder water.

8. The method according to claim 6 wherein said ketone is acetone.

9. An improved fluid for use in a hot dry rock geothermal system comprising a mixture of water and acetone.

10. The fluid of claim 9 wherein said acetone is present in the amount of 2-99% the remainder of the fluid being water.

11. The fluid of claim 10 wherein said fluid contains 10 to 30% acetone.

* * * * *